(12) United States Patent
Slavens et al.

(10) Patent No.: US 10,370,981 B2
(45) Date of Patent: Aug. 6, 2019

(54) GAS TURBINE ENGINE COMPONENT COOLING CIRCUIT WITH RESPIRATING PEDESTAL

(71) Applicant: UNITED TECHNOLOGIES CORPORATION, Farmington, CT (US)

(72) Inventors: Thomas N. Slavens, Vernon, CT (US); Brooks E. Snyder, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 328 days.

(21) Appl. No.: 15/112,497

(22) PCT Filed: Jan. 26, 2015

(86) PCT No.: PCT/US2015/012805
§ 371 (c)(1),
(2) Date: Jul. 19, 2016

(87) PCT Pub. No.: WO2015/123006
PCT Pub. Date: Aug. 20, 2015

(65) Prior Publication Data
US 2016/0333702 A1     Nov. 17, 2016

Related U.S. Application Data

(60) Provisional application No. 61/939,333, filed on Feb. 13, 2014.

(51) Int. Cl.
*F01D 5/18*     (2006.01)
*F01D 25/12*    (2006.01)
(Continued)

(52) U.S. Cl.
CPC .............. *F01D 5/187* (2013.01); *F01D 9/02* (2013.01); *F01D 11/08* (2013.01); *F01D 25/12* (2013.01);
(Continued)

(58) Field of Classification Search
CPC . F01D 5/18; F01D 5/181; F01D 5/182; F01D 5/187; F01D 5/188; F01D 5/189;
(Continued)

(56) References Cited

U.S. PATENT DOCUMENTS 3,809,794 A    5/1974  Jacobs
4,183,716 A    1/1980  Takahara et al.
(Continued)

OTHER PUBLICATIONS

International Search Report and Written Opinion of the International Searching Authority for International application No. PCT/US2015/012805 dated Apr. 29, 2015.
(Continued)

*Primary Examiner* — Alain Chau
(74) *Attorney, Agent, or Firm* — Carlson, Gaskey & Olds, P.C.

(57) ABSTRACT

A component according to an exemplary aspect of the present disclosure includes, among other things, a pedestal that traverses a flow channel disposed between a first wall and a second wall. The pedestal includes at least one interior bore configured to communicate a cooling fluid inside of the pedestal.

12 Claims, 6 Drawing Sheets

(51) Int. Cl.
*F01D 9/02* (2006.01)
*F23R 3/00* (2006.01)
*F01D 11/08* (2006.01)
*F01D 25/30* (2006.01)

(52) U.S. Cl.
CPC .............. *F01D 25/30* (2013.01); *F23R 3/002* (2013.01); *F05D 2220/32* (2013.01); *F05D 2230/211* (2013.01); *F05D 2230/31* (2013.01); *F05D 2240/35* (2013.01); *F05D 2260/204* (2013.01); *F05D 2260/205* (2013.01); *F05D 2260/2214* (2013.01); *F23R 2900/03045* (2013.01); *Y02T 50/676* (2013.01)

(58) Field of Classification Search
CPC ................. F01D 9/02; F05D 2260/204; F05D 2260/2214; F05D 2260/22141; F05D 2260/205; F05D 2220/32; F05D 2230/211; F05D 2230/31; F05D 2240/35; F23R 3/002; F23R 2900/03044; F23R 2900/03045; F23R 2900/03043; F28F 9/24; F15D 1/003; Y02T 50/676
See application file for complete search history.

(56) References Cited

U.S. PATENT DOCUMENTS

| | | | | |
|---|---|---|---|---|
| 4,379,677 A * | 4/1983 | Hallinger | ................ | F01D 11/24 415/116 |
| 5,250,136 A * | 10/1993 | O'Connor | ................ | B22C 9/04 156/272.2 |
| 5,328,331 A | 7/1994 | Bunker et al. | | |
| 5,391,052 A * | 2/1995 | Correia | ................ | F01D 11/10 415/115 |
| 5,533,864 A * | 7/1996 | Nomoto | ................ | F01D 5/186 415/115 |
| 5,586,866 A * | 12/1996 | Wettstein | ................ | F01D 5/189 416/96 A |
| 5,660,524 A | 8/1997 | Lee et al. | | |
| 5,743,708 A * | 4/1998 | Cunha | ................ | F01D 5/187 415/115 |
| 5,931,638 A | 8/1999 | Krause et al. | | |
| 6,000,908 A * | 12/1999 | Bunker | ................ | F01D 5/189 165/908 |
| 6,047,552 A * | 4/2000 | Gross | ................ | F23R 3/002 165/908 |
| 6,213,714 B1 | 4/2001 | Rhodes | | |
| 6,237,344 B1 * | 5/2001 | Lee | ................ | F01D 5/186 165/908 |
| 6,439,846 B1 * | 8/2002 | Anderson | ................ | F01D 5/187 416/96 A |
| 6,511,293 B2 * | 1/2003 | Widrig | ................ | F01D 5/187 415/115 |
| 6,955,522 B2 | 10/2005 | Cunha et al. | | |
| 7,186,084 B2 * | 3/2007 | Bunker | ................ | F01D 5/187 416/96 R |
| 7,303,375 B2 | 12/2007 | Cunha et al. | | |
| 7,665,968 B2 | 2/2010 | Mongillo, Jr. et al. | | |
| 7,938,624 B2 * | 5/2011 | Tibbott | ................ | F01D 5/187 415/115 |
| 8,596,963 B1 | 12/2013 | Liang | | |
| 8,608,430 B1 * | 12/2013 | Liang | ................ | F01D 5/187 415/115 |
| 8,667,682 B2 * | 3/2014 | Lee | ................ | B21K 3/00 29/890.01 |
| 9,347,324 B2 * | 5/2016 | Lee | ................ | F01D 5/188 |
| 2002/0182056 A1 * | 12/2002 | Widrig | ................ | F01D 5/187 415/114 |
| 2003/0133797 A1 | 7/2003 | Dailey | | |
| 2010/0068069 A1 | 3/2010 | Ahmad | | |
| 2010/0251723 A1 * | 10/2010 | Chen | ................ | F02C 7/18 60/760 |
| 2010/0254824 A1 | 10/2010 | Naik et al. | | |
| 2012/0070306 A1 | 3/2012 | Lee et al. | | |
| 2012/0201653 A1 | 8/2012 | Moga et al. | | |
| 2013/0025287 A1 * | 1/2013 | Cunha | ................ | F23R 3/002 60/772 |
| 2013/0047618 A1 * | 2/2013 | Gregory | ................ | F23R 3/002 60/722 |
| 2013/0232991 A1 | 9/2013 | Otero | | |
| 2014/0120274 A1 * | 5/2014 | Bunker | ................ | C23C 14/5886 428/34.1 |

OTHER PUBLICATIONS

Extended European Search Report for Application No. EP 15 74 8674 dated Aug. 14, 2017.

* cited by examiner

GAS TURBINE ENGINE COMPONENT COOLING CIRCUIT WITH RESPIRATING PEDESTAL

CROSS REFERENCE TO RELATED APPLICATION

This application claims priority to U.S. Provisional Application No. 61/939,333, which was filed on Feb. 13, 2014.

BACKGROUND

This disclosure relates to a gas turbine engine, and more particularly to a gas turbine engine component having an internal cooling circuit. The internal cooling circuit may include one or more respirating pedestals configured to create a convection sink to cool an area of the component.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Because they are commonly exposed to hot combustion gases, many gas turbine engine components employ internal cooling circuits that channel a dedicated cooling fluid for cooling regions of the component. Thermal energy is transferred from the component to the cooling fluid to convectively cool the component. Some cooling circuits employ film cooling holes that return a portion of the cooling fluid to the gas path as a layer of film that protects the component against the relatively harsh environment of the gas path.

SUMMARY

A component according to an exemplary aspect of the present disclosure includes, among other things, a pedestal that traverses a flow channel disposed between a first wall and a second wall. The pedestal includes at least one interior bore configured to communicate a cooling fluid inside of the pedestal.

In a further non-limiting embodiment of the foregoing component, the component is one of a blade, a vane, a shroud, a blade outer air seal (BOAS), a combustor liner and a turbine exhaust case liner.

In a further non-limiting embodiment of either of the foregoing components, the at least one interior bore feeds the cooling fluid from a cavity inside of the second wall.

In a further non-limiting embodiment of any of the foregoing components, a head of the pedestal is received in a trough formed in the first wall.

In a further non-limiting embodiment of any of the foregoing components, the at least one interior bore feeds the cooling fluid to a cavity inside of the second wall.

In a further non-limiting embodiment of any of the foregoing components, the pedestal is disposed at a leading edge region or a trailing edge region of the component.

In a further non-limiting embodiment of any of the foregoing components, the first wall is an outer wall and the second wall is an inner wall.

In a further non-limiting embodiment of any of the foregoing components, the pedestal includes a body and a head that extends transversely from the body.

In a further non-limiting embodiment of any of the foregoing components, at least one of the head and the body includes the at least one interior bore.

In a further non-limiting embodiment of any of the foregoing components, a plurality of pedestals are arranged in rows inside of the component, each of the plurality of pedestals traversing the flow channel.

A gas turbine engine according to another exemplary aspect of the present disclosure includes, among other things, a component that defines a cooling circuit configured to cool the component with a cooling fluid. The cooling circuit includes a flow channel disposed between a first wall and a second wall of the component and a pedestal that extends across the flow channel.

In a further non-limiting embodiment of the foregoing gas turbine engine, the flow channel is a microcircuit.

In a further non-limiting embodiment of either of the foregoing gas turbine engines, the cooling circuit is disposed inside an airfoil of the component.

In a further non-limiting embodiment of any of the foregoing gas turbine engines, the flow channel connects between a first cavity and a second cavity formed inside of the component.

In a further non-limiting embodiment of any of the foregoing gas turbine engines, the cooling circuit excludes film cooling holes.

A method of cooling a gas turbine engine component, according to another exemplary aspect of the present disclosure includes, among other things, communicating a first cooling fluid in a first direction through a flow channel of a cooling circuit of the gas turbine engine component and cooling the first cooling fluid with a second cooling fluid that is communicated in a second, different direction inside a pedestal that traverses the flow channel.

In a further non-limiting embodiment of the foregoing method, the method includes expelling the second cooling fluid into a cavity of the cooling circuit.

In a further non-limiting embodiment of either of the foregoing methods, the method includes radially communicating the first cooling fluid within a first cavity of the cooling circuit, communicating the first cooling fluid across the pedestal within the flow channel, and expelling the first cooling fluid into a second cavity of the cooling circuit.

In a further non-limiting embodiment of any of the foregoing methods, the second cooling fluid is extracted from the first cooling fluid inside of the flow channel.

In a further non-limiting embodiment of any of the foregoing methods, the gas turbine engine component is cast using a casting article that is manufactured layer-by-layer using an additive manufacturing process.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to a gas turbine engine component that includes an internal cooling circuit. The cooling circuit employs one or more respirating pedestals that define at least one interior bore configured to communicate a cooling fluid inside of the pedestal. Communicating the cooling fluid through the interior bore of the pedestal creates a convective sink for cooling targeted areas of the gas turbine engine component. For example, the exemplary cooling circuit may be implemented within a leading edge or trailing edge region of a gas turbine engine component. The gas turbine engine component may be additively manufactured to include the respirating pedestals, or may be manufactured using an additively manufactured casting article that is configured to create the pedestals inside the component during a subsequent casting process. These and other features are discussed in greater detail herein.

Figure 1:
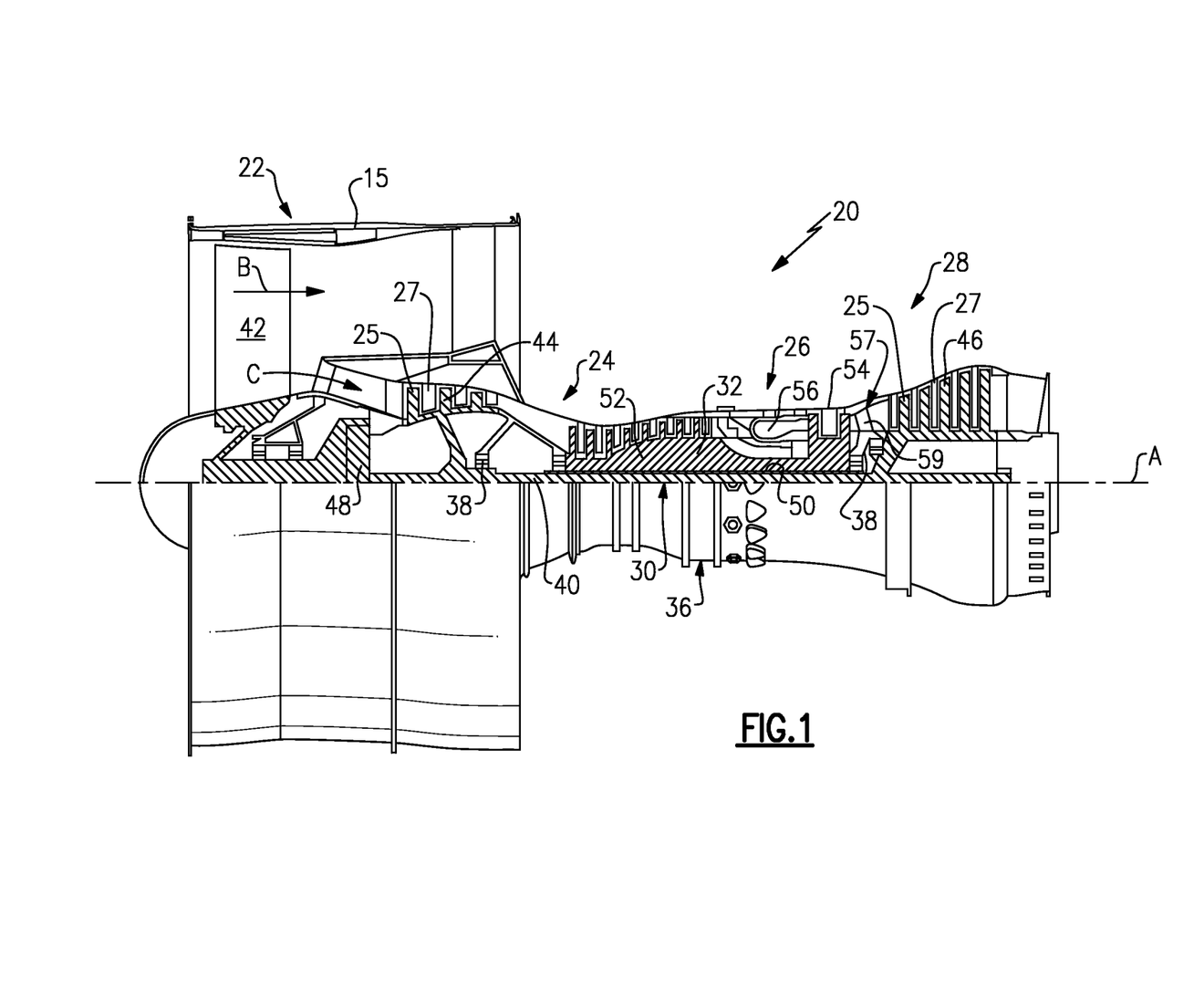
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Each of the compressor section 24 and the turbine section 28 may include alternating rows of rotor assemblies and vane assemblies (shown schematically). For example, the rotor assemblies can carry a plurality of rotating blades 25, while each vane assembly can carry a plurality of vanes 27 that extend into the core flow path C. The blades 25 create or extract energy in the form of pressure from the core airflow that is communicated along the core flow path C. The vanes 27 direct the core airflow to the blades 25 to either add or extract energy.

Various components of the gas turbine engine 20, including but not limited to the airfoils of the blades 25 and the vanes 27, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Exemplary embodiments of such cooling circuits that include novel respirating pedestals are discussed in greater detail below.

Figure 2:
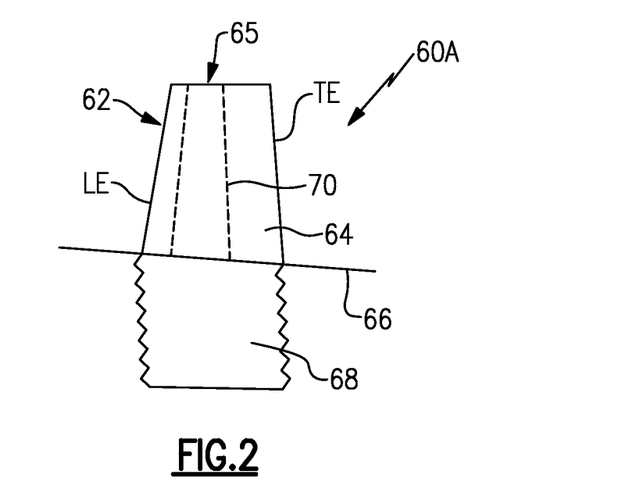
FIG. 2 illustrates a first embodiment of a gas turbine engine component.

FIG. 2 illustrates a component 60A having an internal cooling circuit 65 for cooling the component 60A. The component 60A may include a body 62 that defines both an external and internal shape of the component 60A. The body 62 extends between a leading edge LE and a trailing edge TE and may include an airfoil section 64, a platform 66 and a root 68. The airfoil section 64 extends outwardly in a first direction from the platform 66, and the root 68 extends from the platform 66 in an opposed, second direction away from the airfoil section 64. The root 68 is configured for connecting the component 60A to a rotating disk (not shown).

The exemplary cooling circuit 65 may include one or more cavities 70 that are disposed through the body 62. The cavities 70 are shown schematically via dashed lines in FIG. 2. It is to be understood that the cooling circuit 65 is not limited to the size, shape or quantity of cavities 70 depicted by these Figures. Although not shown, the cavities 70 may be fed with a cooling fluid, such as relatively cool bleed airflow sourced from the compressor section 24, for convectively cooling the components 60A.

In one embodiment, the cavities 70 are main cooling cavities of the cooling circuit 65. The cavities 70 may extend radially, axially and circumferentially inside of the body 62 for channeling the cooling fluid. Although not shown in this embodiment, the cooling circuit 65 could additionally include other passages, including but not limited to flow passages or microcircuits, within the scope of this disclosure.

The embodiment of FIG. 2 depicts the component 60A as a blade, such as a turbine blade. It is to be appreciated, however, that the cooling circuits of this disclosure are not limited for use in connection with turbine blades and could alternatively or additionally be employed within vanes, blade outer air seals (BOAS), combustor liners, casing structures, shrouds, turbine exhaust case liners, or any other gas turbine engine component that may benefit from dedicated internal cooling, including some compressor components.

Figure 3:
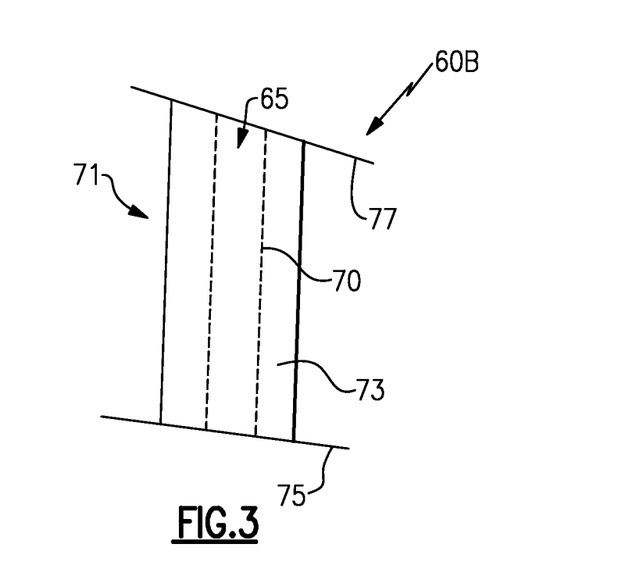
FIG. 3 illustrates a second embodiment of a gas turbine engine component.

FIG. 3 illustrates a second non-limiting embodiment of a component 60B that may employ a cooling circuit 65. Here, the component 60B is depicted as a vane. The component 60B may include a body 71 having an airfoil section 73 that extends between an inner platform 75 and an outer platform 77. A cavity 70 of the cooling circuit 65 may extend inside of the airfoil section 73 or any other portion of the component 60B.

As discussed in greater detail below, the cooling circuits 65 described above with reference to FIGS. 2 and 3 may include features such as respirating pedestals that are arranged inside of the components 60A, 60B for creating a convective sink to cool targeted areas of the component.

Figure 4:
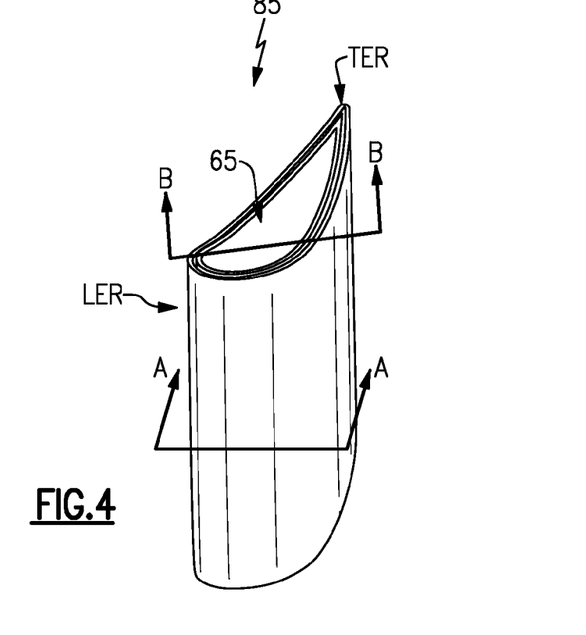
FIG. 4 illustrates a gas turbine engine component that employs an exemplary cooling circuit.
Figure 5:
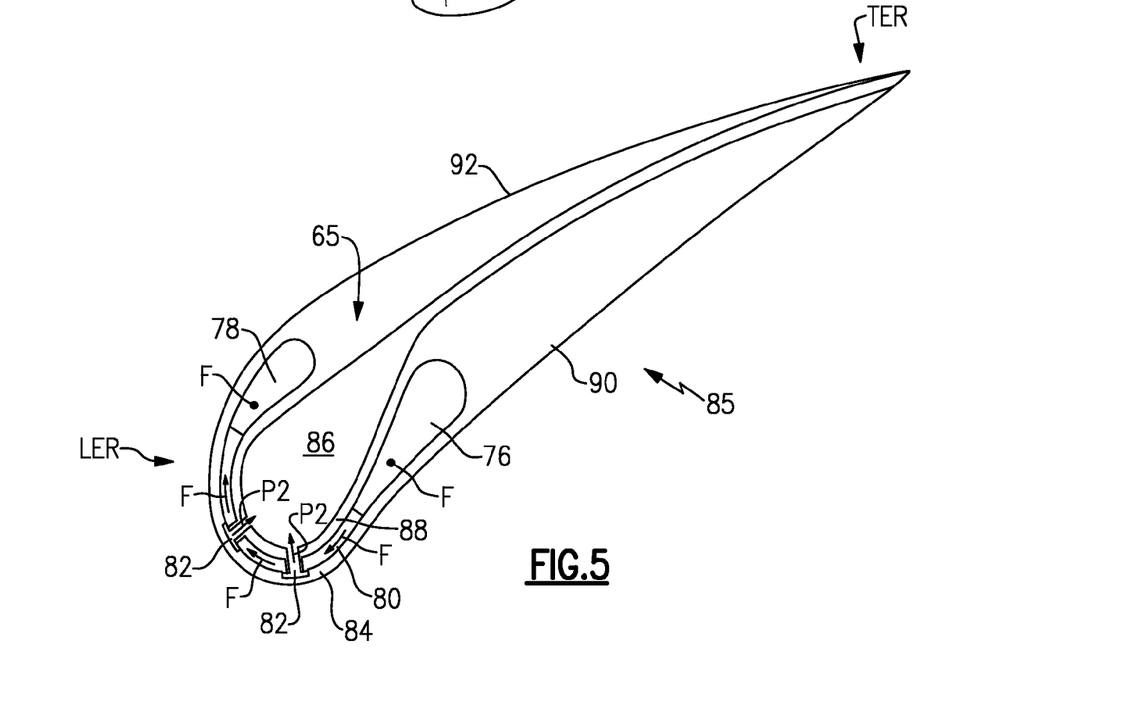
FIG. 5 illustrates a sectional view through section A-A of FIG. 4.

FIGS. 4 and 5 illustrate a cooling circuit 65 disposed inside of a gas turbine engine component 85. Although not shown, the gas turbine engine component 85 could include additional cooling circuits. The gas turbine engine component 85 could be a blade or vane (similar to those shown in FIGS. 2 and 3) or any other gas turbine engine component that may benefit from dedicated internal cooling. In addition, although depicted inside of an airfoil, the inventive cooling circuit 65 may be incorporated into non-airfoil components.

In one embodiment, the cooling circuit 65 is disposed at a leading edge region LER of the component 85. However, this is intended as a non-limiting embodiment. Stated differently, other locations, including but not limited to a trailing edge region (TER) of the gas turbine engine component 85 (see also FIG. 10), could benefit from the teachings of this disclosure.

The exemplary cooling circuit 65 may include a first cavity 76, a second cavity 78, and a flow channel 80 that connects between the first cavity 76 and the second cavity 78. One or more pedestals 82 may traverse or extend across the flow channel 80. In one embodiment, the pedestals 82 extend between a first wall 84 of the gas turbine engine component 85 and a third cavity 86. The pedestals 82 may additionally structurally support both the first wall 84 and a second wall 88 of the gas turbine engine component 85. In another embodiment, the pedestals 82 extend completely through the second wall 88. In one non-limiting embodiment, the first wall 84 is an outer wall and the second wall 88 is an inner wall of the gas turbine engine component 85. However, the pedestals 82 could extend between any walls.

In one non-limiting embodiment, the cooling circuit 65 includes a plurality of pedestals 82. The pedestals 82 may be arranged in one or more rows of radially spaced pedestals. The total number of pedestals 82 as well as the numbers of rows of the pedestals 82 employed by the cooling circuit 65 is not intended to limit this disclosure.

The third cavity 86 may be at least partially circumscribed by the second wall 88. The third cavity 86 may extend to the TER of the component 85 (see FIG. 5). Alternatively, the third cavity 86 could terminate at either a pressure side 90 or a suction side 92 of the gas turbine engine component 85.

In one non-limiting utilization of the cooling circuit 65, a cooling fluid F may be radially communicated through the first cavity 76, circulated through the flow channel 80 from the pressure side 90 toward the suction side 92, and then expelled into the second cavity 78. As discussed in greater detail below, a portion P2 of the cooling fluid F may be communicated inside (or through) the pedestals 82 and into the third cavity 86. In other words, the pedestals 82 may be at least partially hollow such that airflow can be communicated therethrough.

In one non-limiting embodiment, the gas turbine engine component 85 is additively manufactured to include the cooling circuit 65 and pedestals 82. In another embodiment, a casting article that is usable to manufacture the gas turbine engine component 85 (in a subsequent casting process) is additively manufactured. An exemplary additive manufacturing process includes building the component/casting article layer-by-layer by delivering a powdered material, such as a ceramic material or refractory metal material, to a build platform. A layer of the powdered material is then melted at locations where the geometry of the final part is to exist. A laser, electron beam melting device or any other melting device may be used to melt the layers of powdered material. The build platform may then be moved and a second layer of powered material may be added and melted to prepare a second layer of the part. This layer-by-layer process may be repeated until the entire gas turbine engine component 85 or casting article has been additively built. In one embodiment, the layers of the component/casting article may be joined to one another with reference to CAD data that defines a cross-section of a desired geometry of the part.

Figure 6:
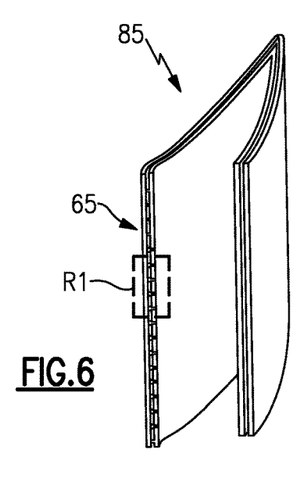
FIG. 6 illustrates a sectional view through section B-B of FIG. 4.
Figure 7:
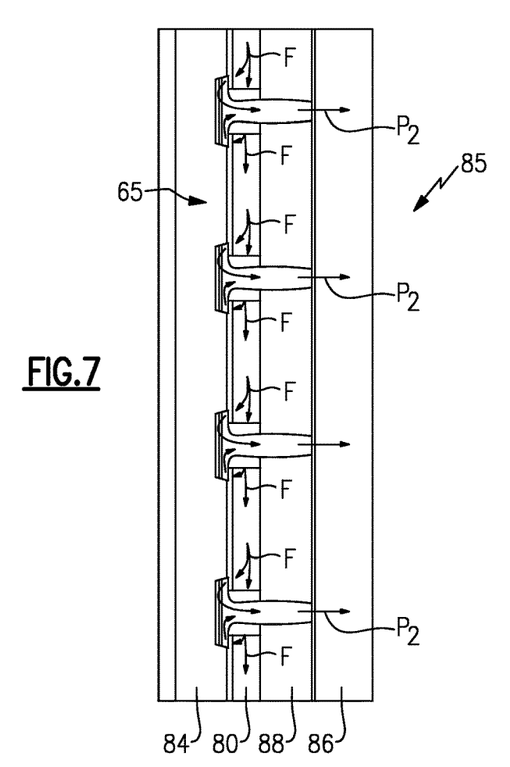
FIG. 7 illustrates a blown-up view of region R1 of FIG. 6.

FIGS. 6 and 7 illustrate a radial view of the cooling circuit 65, which in this embodiment is depicted as a near-wall cooling scheme. In one embodiment, the flow channel 80 is disposed between the first wall 84 and the second wall 88 of the gas turbine engine component 85. The cooling fluid F may circulate through the flow channel 80 to convectively cool a region of the gas turbine engine component 85.

A portion P2 of the cooling fluid F may be extracted from the flow channel 80 and communicated through an interior of the pedestals 82 to supply the third cavity 86. The third cavity 86 feeds to a lower exterior sink pressure, thereby creating a suction force that causes the portion P2 of the cooling fluid F to enter into the hollow pedestals 82 from the flow channel 80. Alternatively, the third cavity 86 may feed the cooling fluid F through the pedestals 82 and into the flow channel 80. In other words, the direction of flow of the cooling fluid F within the cooling circuit 65 is not intended to limit this disclosure.

The pedestals 82 may be referred to as "respirating" pedestals because they breathe airflow through the hollow portions. The respirating pedestals 82 enable adequate cooling of the gas turbine engine component 85 without the use of film cooling holes. Film cooling may or may not be utilized in other regions of the gas turbine engine component 85.

Figure 8A:
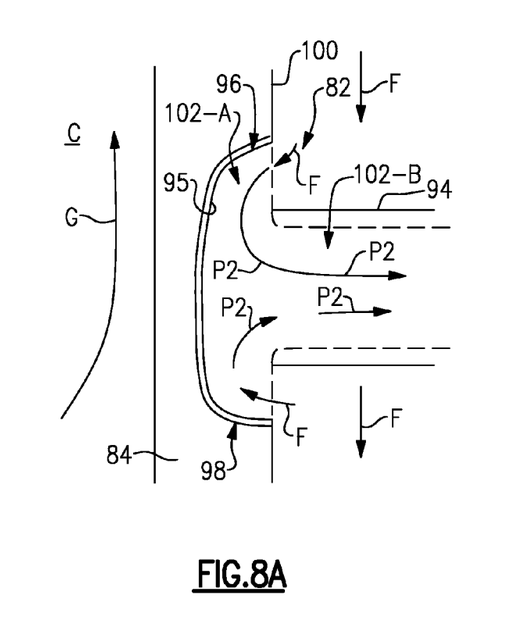
FIGS. 8A and 8B illustrate a respirating pedestal of a cooling circuit.
Figure 8B:
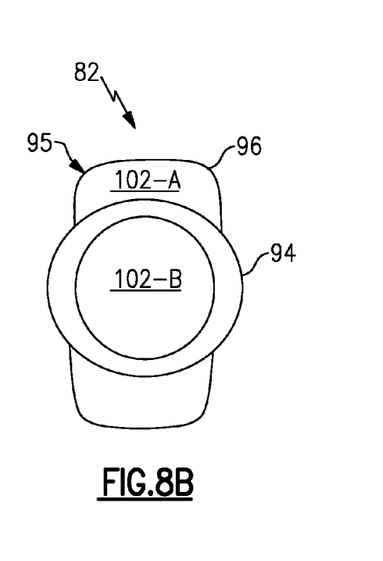

Referring now to FIGS. 8A and 8B, the pedestals 82 may include a body 94 and a head 96 that extends transversely from the body 94. The body 94 may be round, oblong or some other suitable shape. In one embodiment, the head 96 includes a curved outer surface 95. The curved outer surface 95 of the head 96 may be received within troughs 98 formed on an interior surface 100 of the first wall 84 (best illustrated in FIG. 8A). The troughs 98 generally match the curvature of the curved outer surface 95. Although a space is shown between the trough 98 and the head 96 of the pedestal 82 in FIG. 8A, it should be understood that these parts could be in direct contact with one another or completely fused together in the final manufactured component.

In another embodiment, the head 96 of the pedestal 82 may include an interior bore 102-A and the body 94 may similarly include an interior bore 102-B for communicating the portion P2 of the cooling fluid F inside of the pedestal 82. In other words, the pedestals 82 are at least partially hollow. The interior bores 102-A, 102-B are in fluid communication with one another such that the portions P2 of the cooling fluid F can easily circulate into and through the pedestals 82.

The first wall 84 is exposed to the hot combustion gases G of the core flow path C. The first wall 84 is convectively cooled by the relatively cool portions P2 of the cooling fluid F as it is communicated through the interior bores 102-A, 102-B before feeding another, lower-pressure cavity (see, for example, the third cavity 86 of FIG. 5).

Figure 9:
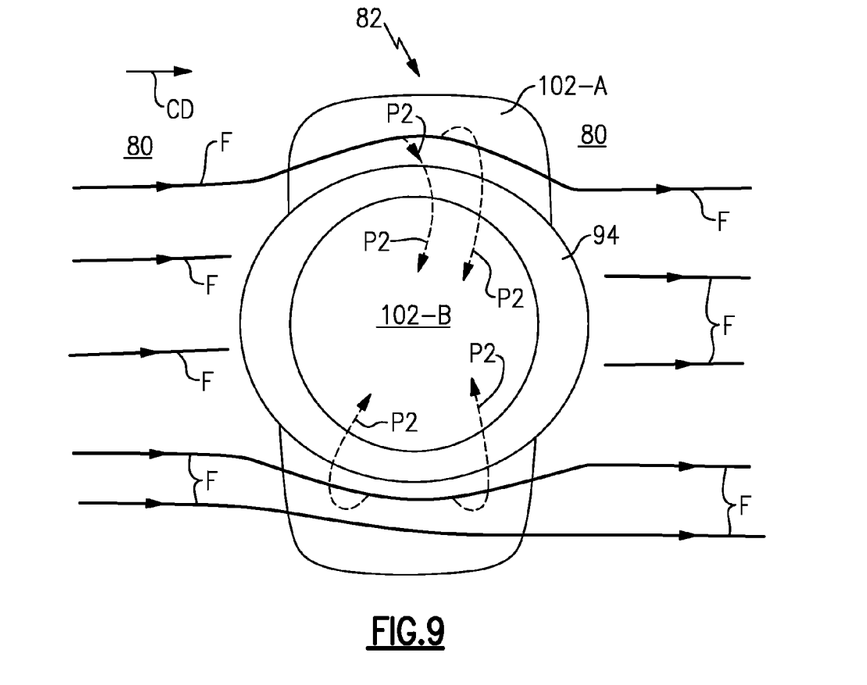
FIG. 9 schematically illustrates a method of cooling a gas turbine engine component.

FIG. 9 schematically illustrates a method of cooling a gas turbine engine component 85 that includes using a respirating pedestal 82. In this embodiment, the cooling fluid F is communicated generally in the circumferential direction CD inside of the gas turbine engine component 85 within the flow channel 80. The cooling fluid F flows around the body 94 of the pedestal 82 to affect heat transfer. Meanwhile, portions P2 of the cooling fluid F are communicated inside of the interior bores 102-A, 102-B of the pedestal 82. The flow of the portions P2 within the interior bore 102-B may be generally perpendicular to the flow of the cooling fluid F within the flow channel 80. In other words, the cooling fluid F and the portions P2 flow in different directions. The portions P2 convectively cool the first wall 84 and may also exchange heat with the cooling fluid F within the flow passage 80 to provide additional cooling benefits.

Figure 10:
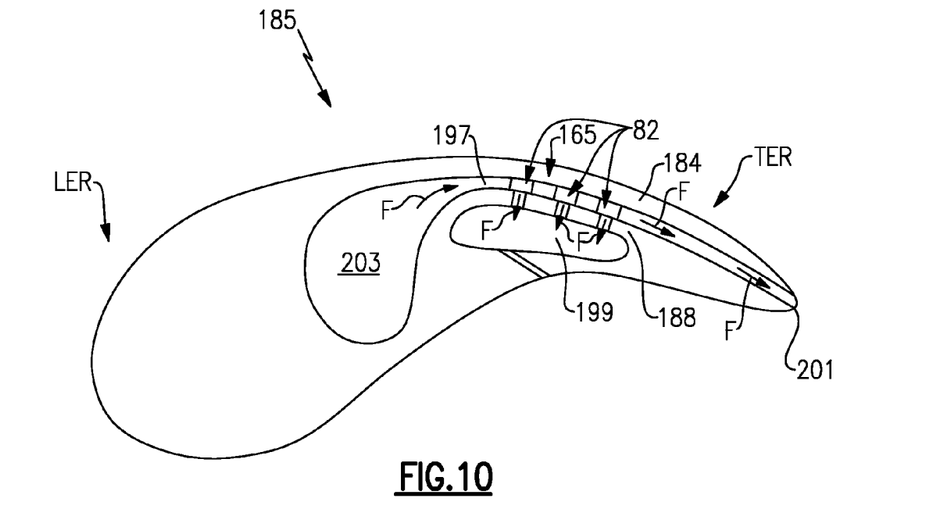
FIG. 10 illustrates a cooling circuit according to another embodiment of this disclosure.

FIG. 10 illustrates another exemplary cooling circuit 165 that may be incorporated into a gas turbine engine component 185. Like the cooling circuit 65, the cooling circuit 165 includes respirating pedestals 82. However, in this embodiment, rather than cooling a leading edge region (LER) of the component, the cooling circuit 165 is configured to cool a trailing edge region (TER) of the gas turbine engine component. These are but non-limiting examples, and any other region of a component may additionally or alternatively be cooled by the exemplary cooling circuits of this disclosure.

In this embodiment, the cooling circuit 165 may include a first cavity 199 and a flow channel 197 that extends to a trailing edge 201 of the component 185. A second cavity 203 may fluidly connect with the flow channel 197 to feed cooling fluid F therein.

The pedestals 82 may traverse or extend across the flow channel 197. In one embodiment, the pedestals 82 extend between a first wall 184 and a second wall 188 of the gas turbine engine component 185 to communicate a cooling fluid F into the first cavity 199. Some portion of the cooling fluid F may also be communicated to the trailing edge 201 within the flow channel 197. The pedestals 82 may additionally structurally support both the first wall 184 and the second wall 188 of the gas turbine engine component 185.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component, comprising:
an airfoil section having an outer wall and an inner wall; and
a pedestal that traverses across a flow channel from said outer wall to said inner wall, said flow channel disposed between said outer wall and said inner wall, said pedestal including a body and a head that extends transversely from said body, said head including at least one interior bore in fluid communication with said flow channel, and said body including a second bore extending from said head to said inner wall, wherein said at least one interior bore is configured to receive a cooling fluid from said flow channel and communicate said cooling fluid inside of said pedestal through said second bore and into a cavity formed inside of said inner wall.

2. The component as recited in claim 1, wherein said at least one interior bore feeds said cooling fluid from a cavity inside of said inner wall.

3. The component as recited in claim 1, wherein a head of said pedestal is received in a trough formed in said outer wall.

4. The component as recited in claim 1, wherein said pedestal is disposed at a leading edge region or a trailing edge region of said component.

5. The component as recited in claim 1, wherein said head includes a curved outer surface received within a trough formed on an interior surface of said outer wall.

6. The component as recited in claim 1, comprising a plurality of pedestals arranged in rows inside of said component, each of said plurality of pedestals traversing said flow channel.

7. A gas turbine engine, comprising:
an airfoil including a cooling circuit configured to cool said airfoil with a cooling fluid, said cooling circuit including:
a flow channel disposed between an outer wall and an inner wall of said airfoil and
a pedestal that extends from said outer wall to said inner wall across said flow channel between said outer wall and said inner wall, wherein said pedestal includes a hollow portion in fluid communication with said flow channel, wherein said pedestal includes a body and a head that extends transversely from said body, said head including at least one interior bore fluidly connecting said flow passage with said hollow portion,
wherein said flow channel connects between a first cavity and a second cavity formed inside of said airfoil, and said at least one interior bore is configured to receive a cooling fluid from the flow channel and communicate said cooling fluid inside said pedestal through said hollow portion and into a third cavity opposite said flow channel from said inner wall.

8. The gas turbine engine as recited in claim 7, wherein said flow channel is a microcircuit.

9. The gas turbine engine as recited in claim 7, wherein said cooling circuit excludes film cooling holes.

10. A method of cooling a gas turbine engine component, comprising:
communicating a first cooling fluid in a first direction through a flow channel of a cooling circuit disposed within an airfoil of the gas turbine engine component, wherein the flow channel is disposed between an outer wall and an inner wall of said airfoil;
cooling the first cooling fluid with a second cooling fluid that is communicated in a second direction generally perpendicular to the first direction inside a pedestal that traverses across the flow channel from the outer wall to the inner wall, wherein the pedestal includes a head and a body that extends transversely from the head;
extracting the second cooling fluid from the first cooling fluid inside of the flow channel through the head;
communicating the second cooling fluid through the body in the second direction; and
expelling in said second direction the second cooling fluid into an inner cavity formed within the inner wall of said airfoil.

11. The method as recited in claim 10, comprising:
communicating the first cooling fluid within a first cavity of the cooling circuit;
communicating the first cooling fluid across the pedestal within the flow channel; and
expelling the first cooling fluid into a second cavity of the cooling circuit.

12. The method as recited in claim 10, wherein the gas turbine engine component is cast using a casting article that is manufactured layer-by-layer using an additive manufacturing process.

* * * * *